US012786922B2

(12) United States Patent
Ryu

(10) Patent No.: US 12,786,922 B2
(45) Date of Patent: Nov. 3, 2026

(54) NON-HOMOGENEOUS NETWORK SLICE

(71) Applicant: Boost SubscriberCo L.L.C., Englewood, CO (US)

(72) Inventor: Jinsook Ryu, Oakton, VA (US)

(73) Assignee: Boost SubscriberCo L.L.C., Englewood, CO (US)

(*) Notice: Subject to any disclaimer, the term of this patent is extended or adjusted under 35 U.S.C. 154(b) by 697 days.

(21) Appl. No.: 18/328,097

(22) Filed: Jun. 2, 2023

(65) Prior Publication Data

US 2023/0397146 A1 Dec. 7, 2023

Related U.S. Application Data

(60) Provisional application No. 63/349,702, filed on Jun. 7, 2022.

(51) Int. Cl.
*H04W 60/00* (2009.01)
*H04W 48/18* (2009.01)

(52) U.S. Cl.
CPC ........... *H04W 60/00* (2013.01); *H04W 48/18* (2013.01)

(58) Field of Classification Search
CPC ....... H04W 60/00; H04W 48/18; H04W 8/22; H04W 60/04
See application file for complete search history.

(56) References Cited

U.S. PATENT DOCUMENTS

2021/0306972 A1* 9/2021 Watfa .................... H04W 12/61
2022/0264505 A1* 8/2022 Ianev .................... H04W 60/00
2023/0370950 A1* 11/2023 Shekhar ................ H04W 48/18

FOREIGN PATENT DOCUMENTS

EP 3 993 466 A1 5/2022

OTHER PUBLICATIONS

"3rd Generation Partnership Project; Technical Specification Group Services and System Aspects; System architecture for the 5G System (5GS); Stage 2 (Release 17)", 3GPP Standard; 3GPP TS 23.501, 3rd Generation Partnership Project (3GPP), Mobile Competence Centre; 650, Route Des Lucioles; F-06921 Sophia-Antipolis Cedex; France, vol. SA WG2, No. V17.4.0 Mar. 23, 2022, pp. 1-567, XP052144759, Retrieved from the Internet: URL: https://ftp.3gpp.org/Specs/archive/23_series/23.501/123501-h40.zip 23501-h40.docs [retrieved on Mar. 23, 2022] pp. 238-243.

* cited by examiner

*Primary Examiner* — Marcus Hammonds
(74) *Attorney, Agent, or Firm* — Kilpatrick Townsend & Stockton LLP

(57) ABSTRACT

Embodiments support non-homogeneous distribution of networks slices over a registration area (RA) in a manner that helps to ensure proper signaling of user equipment (UE) re-registration in cases of conditional network slices. For example, an RA is established to include conditional network slices that are available in only a subset of the tracking areas (TAs) of the RA. Each conditional network slice can be associated with a re-registration condition that explicitly or implicitly dictates whether the UE must re-register for that network slice prior to utilizing the network slice and upon entering a TA in the RA where the network slice is supported. For example, the re-registration condition can relate to whether the network slice is subject to Network Slice Admission Control (NSAC) and/or Network Slice Specific authentication & Authorization (NSSAA).

18 Claims, 10 Drawing Sheets

NON-HOMOGENEOUS NETWORK SLICE

CROSS REFERENCE TO RELATED APPLICATIONS

This application claims priority to U.S. Provisional Patent Application No. 63/349,702, filed on Jun. 7, 2022, the disclosure of which is incorporated by reference in its entirety for all purposes.

FIELD

Embodiments relate generally to wireless communication networks, and, more particularly to registration by user equipment devices for networks slices in registration areas with non-homogeneous tracking areas.

BACKGROUND

Some modern wireless communication networks, such as fifth generation (5G) wireless networks, have begun to support so-called network slicing. The communication network includes physical (e.g., multi-domain) infrastructure, such as transport network infrastructure, core network infrastructure, and access network infrastructure. Virtual network operators (VNOs), also referred to as mobile network operators (MNOs), mobile virtual network operators (MVNOs), and the like can concurrently use the physical infrastructure to offer multiple virtualized networks.

Such network slices can be implemented using various virtualization technologies, such as software-defined networking (SDN) and network functions virtualization (NFV) (also referred to as virtualized network functions (VNFs)). Each of those virtualized networks is considered to be a network slice, and each network slice can be designed (e.g., optimized) to support a particular desired set of users, applications, services, network functions, etc. Each network slice can be implemented with its own management domain and its own automation, and each network slice can be logically separated from other network slices. For example, different network slices can be used to separate and/or prioritize traffic, manage security, maintain separation between customers and/or services, etc.

SUMMARY

Embodiments provide novel approaches to improving support for non-homogeneous distribution of networks slices over an RA in a manner that helps to ensure proper signaling of UE re-registration (mobility registration updates) in cases of conditionally allowed network slices. For example, when a UE sends a registration request to the AMF with a list of desired network slices, the AMF uses various local policies to determine an optimal RA, even if not all requested network slices are supported in all TAs of the RA. Any requested network slices that are available homogenously across the RA (i.e., in all TAs of the RA) can be indicated by the AMF as part of an allowed set of network slices for the UE in the RA. Any requested network slices that are available non-homogenously across the RA (i.e., in at least one, but fewer than all TAs of the RA) can be indicated by the AMF as part of a conditional (e.g., partially allowed or partially rejected) set of network slices for the UE in the RA. Each network slice in the conditional set can be further associated with a re-registration condition that explicitly or implicitly dictates whether the UE must re-register for that network slice prior to utilizing the network slice and upon entering a TA in the RA where the network slice is supported. For example, the re-registration condition can relate to whether the network slice is subject to Network Slice Admission Control (NSAC) and/or Network Slice Specific authentication & Authorization (NSSAA).

According to one set of embodiments, a method is provided for non-homogeneous network slice support over a registration area of a cellular communication network infrastructure. The method includes: receiving a registration request from a user equipment device (UE) by an access and mobility management function (AMF) of the cellular communication network infrastructure, the registration request indicating a requested network slice selection assistance information (NSSAI) corresponding to a list of single-NSSAIs (S-NSSAIs); determining, by the AMF responsive to the registration request, a registration area (RA) as having a plurality of tracking areas (TAs), an allowed NSSAI corresponding to a first subset of the S-NSSAIs that are supported in all of the TAs of the RA, and a conditional NSSAI corresponding to a second subset of the S-NSSAIs that are supported in only a subset of the TAs of the RA, each particular S-NSSAI of the conditional NSSAI being associated with a respective re-registration condition that defines whether the particular S-NSSAI is allowed for access by the UE without re-registration in TAs of the RA where the particular S-NSSAI is supported; and communicating a registration response message by the AMF to the UE to indicate at least the allowed NSSAI and the conditional NSSAI.

For example, according to some implementations of such a method, the registration request is received by an AMF from a UE while the UE is in a present TA. In such implementations, each particular S-NSSAI of the conditional NSSAI can be associated with a respective re-registration condition that defines whether the particular S-NSSAI is allowed for access by the UE without re-registration in TAs of the RA where the particular S-NSSAI is supported, and each respective re-registration condition can be based at least on whether the particular S-NSSAI is supported in the present TA and whether the particular S-NSSAI is subject to Network Slice Admission Control (NSAC).

According to another set of embodiments, another method is provided for non-homogeneous network slice support over a registration area of a cellular communication network infrastructure from the perspective of a requesting UE. The method includes: transmitting a registration request by a user equipment device (UE) to an access and mobility management function (AMF) of the cellular communication network infrastructure while the UE is in a present tracking area (TA) of the cellular communication network infrastructure, the registration request indicating a requested network slice selection assistance information (NSSAI) corresponding to a list of single-NSSAIs (S-NSSAIs); and receiving, by the UE from the AMF, responsive to the registration request, a registration response message indicating at least: an allowed NSSAI defining a first subset of the S-NSSAIs determined by the AMF to be supported in all of the TAs of an RA generated by the AMF; and a conditional NSSAI defining a second subset of the S-NSSAIs, each particular S-NSSAI of the conditional NSSAI determined by the AMF to be supported in only a subset of the TAs of the RA and to be associated with a respective re-registration condition that defines whether the particular S-NSSAI is allowed for access by the UE without re-registration in TAs of the RA where the particular S-NSSAI is supported, each respective re-registration condition based at least on whether the particular S-NSSAI is supported in the present TA and whether the particular S-NSSAI is subject to Network Slice Admission Control (NSAC) and/or Network Slice Specific Authentication and Authorization (NSSAA).

According to another set of embodiments, an AMF is provided for deployment in a cellular communication network infrastructure. The AMF includes: one or more network interfaces for communicating with UEs over a radio access network (RAN) of the cellular communication network infrastructure; one or more processors coupled with the one or more network interfaces; and non-transitory memory having instructions stored thereon, which, when executed, cause the one or more processors to perform steps. The steps include: receiving a registration request from a UE via the one or more network interfaces, the registration request indicating a requested NSSAI corresponding to a list of S-NSSAIs; determining, responsive to the registration request, a RA as having a plurality of TAs, an allowed NSSAI corresponding to a first subset of the S-NSSAIs that are supported in all of the TAs of the RA, and a conditional NSSAI corresponding to a second subset of the S-NSSAIs that are supported in only a subset of the TAs of the RA, each particular S-NSSAI of the conditional NSSAI being associated with a respective re-registration condition that defines whether the particular S-NSSAI is allowed for access by the UE without re-registration in TAs of the RA where the particular S-NSSAI is supported; and communicating a registration response message to the UE via the one or more network interfaces to indicate at least the allowed NSSAI and the conditional NSSAI.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures.

Figure 1:
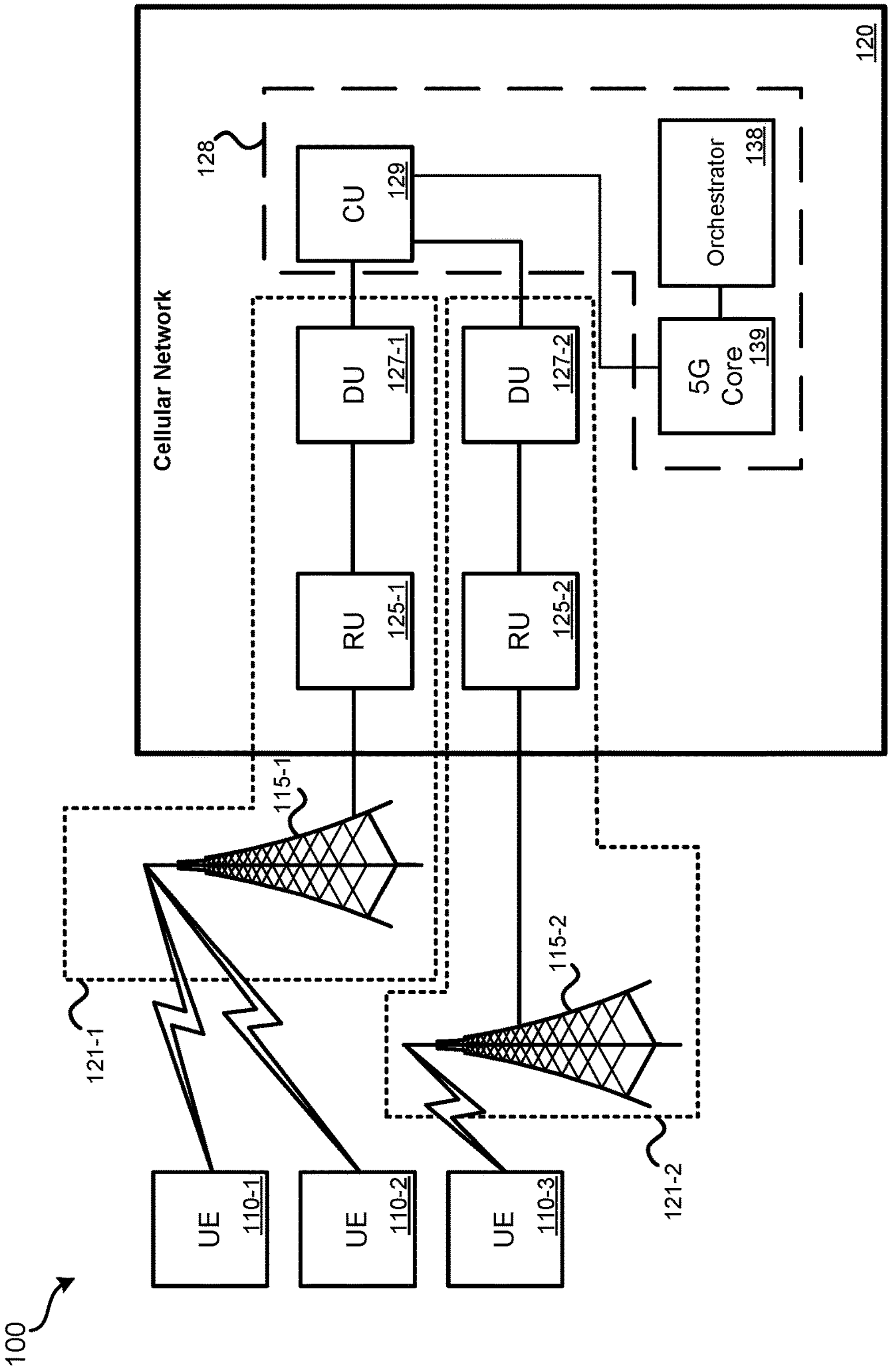
FIG. 1 illustrates an embodiment of a cellular network system as context for several embodiments described herein.

In the appended figures, similar components and/or features may have the same reference label. Further, various components of the same type may be distinguished by following the reference label by a second label (e.g., a lower-case letter) that distinguishes among the similar components. If only the first reference label is used in the specification, the description is applicable to any one of the similar components having the same first reference label irrespective of the second reference label.

DETAILED DESCRIPTION

Embodiments of the disclosed technology will become clearer when reviewed in connection with the description of the figures herein below. In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

For the sake of context, some embodiments are described herein with reference to various networking standards. In general, reference herein to a networking standard beginning with "TS" is intended to refer to a technical specification released by the 3rd Generation Partnership Project (3GPP) in connection with fifth generation (5G) cellular networks. However, such 5G-specific references are intended only to provide illustrative implementations for those contexts and are not intended to limit the application of embodiments described herein to other contexts. For example, innovative embodiments described herein can be applied beyond 5G networks, such as to any suitable previous and future generations and types of cellular and other wireless communication networks.

Some modern wireless communication networks, such as fifth generation (5G) wireless networks, have begun to support so-called network slicing. The communication network includes physical (e.g., multi-domain) infrastructure, such as transport network infrastructure, core network infrastructure, and access network infrastructure. Virtual network operators (VNOs), also referred to as mobile network operators (MNOs), mobile virtual network operators (MVNOs), and the like can concurrently use the physical infrastructure to offer multiple virtualized networks. Such network slices can be implemented using various virtualization technologies, such as software-defined networking (SDN) and network functions virtualization (NFV) (also referred to as virtualized network functions (VNFs). Each of those virtualized networks is considered to be a network slice, and each network slice can be designed (e.g., optimized) to support a particular desired set of users, applications, services, network functions, etc. Each network slice can be implemented with its own management domain and its own automation, and each network slice can be logically separated from other network slices. For example, different network slices can be used to separate and/or prioritize traffic, manage security, maintain separation between customers and/or services, etc.

When user equipment (UE) connects to a 5G network, there are typically two types of registration: initial registration and mobility registration. Initial registration occurs when the UE first enters a network, such as when the UE's power is turned on. In this process, the UE can register with an access and mobility management function (AMF) via a radio access network (RAN). The UE can send current location information and identifying information (e.g., the UE's international mobile subscriber identity, IMSI), and the AMF can assign network identifiers to the UE (e.g., a temporary mobile subscriber identity (TMSI), followed by an international mobile equipment identity (IMEI)). As the UE moves to different areas of the network, it may be asked to perform mobility registration to be permitted to utilize network resources in each new network area. For example, the UE sends a requests for a new registration, along with updated location information and network identifying information, and the AMF updates the network accordingly. Descriptions herein relate to mobility registration. As such, references herein to "registration" intend to refer to mobility registration (i.e., not initial registration) unless specifically noted otherwise. As described herein, some cases of registration are a way to trigger the network (e.g., the AMF) to establish a registration area (RA) for the UE, while other cases of registration are a way for the UE to send the network mobility-related updates while staying within an established RA (e.g., updating location information, etc.). The later cases can alternatively be referred to as "re-registration," as a "Mobility Registration Update" (or MRU), or the like.

Each time a user equipment device (UE) registers to communicate with the network, there is associated signaling, which consumes network resources, UE power resources, etc. As such, it can be desirable to limit how often a mobile UE (e.g., a cell phone) must re-register as it traverses the network. To limit such registrations, 5G network standards provide wireless communication network architectures that facilitate hierarchical registration, and UEs are only required to re-register when they move between so-called "registration areas" (RAs). For example, in a 5G cellular network, a user equipment device (UE) communicates at any given time with a cell tower (e.g., eNodeB), the cell is part of a "tracking area" (TA) (i.e., of one or more cells), and the TA can be part of an RA (i.e., the RA includes one or more TAs). By allowing the UE to register for an RA, the UE can move across multiple TAs and multiple cells without having to re-acquire registration information, such as which network slices are permitted.

Different network slices may be supported in different TAs of any given network (e.g., any public land mobile network (PLMN), any stand-alone non-public network (SNPN), or the like). When a UE registers with the AMF, it requests its desired set of network slices, and the AMF tries to find an optimal RA for providing the UE with access to those requested network slices. Prior conventional approaches tended to enforce network slice homogeneity, ensuring that any network slice available in one TA of an RA should be available in all TAs across an entire RA. Suppose a network has two network slices (Slice A and Slice B) and three TAs (TA1, TA2, and TA3). TA2 supports both Slice A and Slice B and geographically separates TA1 and TA3. TA1 and TA3 each only supports Slice A. If a UE requests registration from any of the TAs, the AMF may have to form an RA with only that TA to satisfy the homogeneity requirement. Further, if the UE requests registration for Slice A and Slice B from either of TA1 or TA3, the AMF will respond that Slice B is unavailable. In such a scenario, any movement by the UE to another TA would require the UE to re-register. Thus, while enforcement of network slice homogeneity can avoid certain complexities involved with network slice management, it also tends to require more frequent re-registration of UEs and uses more related resources.

An alternative approach is to allow for network slice non-homogeneity, which allows for network slices to be available in some, but not all TAs of an RA. For example, when the AMF seeks to optimize the size of the RA with respect to the network slices that can be allowed, it can treat some network slices as "conditionally available" (or "partially available") over the RA. Such an approach allows the AMF to establish larger RAs, thereby reducing the need for UE re-registration. Referring to the above example, suppose the UE requests registration for Slice A and Slice B while in TA1. In response, the AMF could form a single RA to include all of TA1, TA2, and TA3, where Slice B is identified as only available in the TA2 portion of the RA. However, such an approach can result in cases where the UE requests registration from a TA that supports fewer than all the network slices it is requesting. For example, suppose the UE requests registration for both Slice A and Slice B while in TA1. The network must somehow deny the UE access to Slice B in the current TA, while also informing that UE that that Slice B is available for registration in other TAs of the RA.

A prior release of the 5G standard handled such cases by simply denying the UE access to the conditionally available network slice, if the network slice was unavailable in the present TA from which the UE was requesting registration. For example, using the example above, the AMF is allowed to form the RA with all of TA1, TA2, TA3 in response to a UE registration request for Slices A and B. However, if the UE registration request was made from either TA1 or TA3 (where Slice B is unavailable), the UE will be allowed registration for Slice A and denied registration for Slice B. Effectively, under those standards, the UE will be denied access with a message that the network slice (e.g., Slice B in the example) is not available in the RA (not just in the TA). As such, the UE will not attempt to register the network slice again while in that RA, even if the UE moves into another TA in the RA that does include the network slice. Of course, such a limitation of this approach can be addressed by shrinking the RA back to where it only includes TAs with the homogeneously available network slices. For example, if each RA only includes a single TA (or even only those adjacent TAs supporting the same set of network slices), this concern essentially disappears. However, as noted above, shrinking the RA tends to force the UE to re-register more often, thereby consuming more network, power, and other resources.

Embodiments described herein provide improved support for non-homogeneous distribution of networks slices over an RA in a manner that helps to ensure proper signaling of UE re-registration (mobility registration updates) in cases of conditionally allowed network slices. For example, when a UE sends a registration request to the AMF with a list of desired network slices, the AMF uses various local policies to determine an optimal RA, even if not all requested network slices are supported in all TAs of the RA. Any requested network slices that are available homogenously across the RA (i.e., in all TAs of the RA) can be indicated by the AMF as part of an allowed set of network slices for the UE in the RA. Any requested network slices that are available non-homogenously across the RA (i.e., in at least one, but fewer than all TAs of the RA) can be indicated by the AMF as part of a conditional (e.g., partially allowed or partially rejected) set of network slices for the UE in the RA. Each network slice in the conditional set can be further associated with a re-registration condition that explicitly or implicitly dictates whether the UE must re-register for that network slice prior to utilizing the network slice and upon entering a TA in the RA where the network slice is supported. For example, the re-registration condition can relate to whether the network slice is subject to Network Slice Admission Control (NSAC) and/or Network Slice Specific authentication & Authorization (NSSAA).

FIG. 1 illustrates an embodiment of a cellular network system 100 ("system 100") as context for various embodiments described herein. System 100 can include a 5G New Radio (NR) cellular network; other types of cellular networks, such as 6G, 7G, etc. may also be possible. System 100 can include: user equipment (UE) 110 (UE 110-1, UE 110-2, UE 110-3); base station 115; cellular network 120; radio units 125 ("RUs 125"); distributed units 127 ("DUs 127"); centralized unit 129 ("CU 129"); 5G core 139, and orchestrator 138. FIG. 1 represents a component-level view. In an open radio access network (O-RAN), because components can be implemented as specialized software executed on general-purpose hardware, except for components that need to receive and transmit RF, the functionality of the various components can be shifted among different servers. For at least some components, the hardware may be maintained by a separate cloud-service provider, to accommodate where the functionality of such components is needed.

UE 110 can represent various types of end-user devices, such as cellular phones, smartphones, cellular modems, cellular-enabled computerized devices, sensor devices, gaming devices, access points (APs), any computerized device capable of communicating via a cellular network, etc. Generally, UE can represent any type of device that has an incorporated 5G interface, such as a 5G modem. Examples can include sensor devices, Internet of Things (IoT) devices, manufacturing robots; unmanned aerial (or land-based) vehicles, network-connected vehicles, etc. Depending on the location of individual UEs, UE 110 may use RF to communicate with various base stations of cellular network 120. As illustrated, two base stations are illustrated: base station 121 can include: structure 115-1, RU 125-1, and DU 127-1. Structure 115-1 may be any structure to which one or more antennas (not illustrated) of the base station are mounted. Structure 115-1 may be a dedicated cellular tower, a building, a water tower, or any other man-made or natural structure to which one or more antennas can reasonably be mounted to provide cellular coverage to a geographic area. Similarly, base station 121-2 can include: structure 115-2, RU 125-2, and DU 127-2.

Real-world implementations of system 100 can include many (e.g., thousands) of base stations and many CUs and 5G core 139. BS 115 can include one or more antennas that allow RUs 125 to communicate wirelessly with UEs 110. RUs 125 can represent an edge of cellular network 120 where data is transitioned to wireless communication. The radio access technology (RAT) used by RU 125 may be 5G New Radio (NR), or some other RAT. The remainder of cellular network 120 may be based on an exclusive 5G architecture, a hybrid 4G/5G architecture, a 4G architecture, or some other cellular network architecture. Base station equipment 121 may include an RU (e.g., RU 125-1) and a DU (e.g., DU 127-1).

One or more RUs, such as RU 125-1, may communicate with DU 127-1. As an example, at a possible cell site, three RUs may be present, each connected with the same DU. Different RUs may be present for different portions of the spectrum. For instance, a first RU may operate on the spectrum in the citizens broadcast radio service (CBRS) band while a second RU may operate on a separate portion of the spectrum, such as, for example, band 71. One or more DUs, such as DU 127-1, may communicate with CU 129. Collectively, an RU, DU, and CU create a gNodeB, which serves as the radio access network (RAN) of cellular network 120. CU 129 can communicate with 5G core 139. The specific architecture of cellular network 120 can vary by embodiment. Edge cloud server systems outside of cellular network 120 may communicate, either directly, via the Internet, or via some other network, with components of cellular network 120. For example, DU 127-1 may be able to communicate with an edge cloud server system without routing data through CU 129 or 5G core 139. Other DUs may or may not have this capability.

While FIG. 1 illustrates various components of cellular network 120, other embodiments of cellular network 120 can vary the arrangement, communication paths, and specific components of cellular network 120. While RU 125 may include specialized radio access componentry to enable wireless communication with UE 110, other components of cellular network 120 may be implemented using either specialized hardware, specialized firmware, and/or specialized software executed on a general-purpose server system. In an O-RAN arrangement, specialized software on general-purpose hardware may be used to perform the functions of components such as DU 127, CU 129, and 5G core 139. Functionality of such components can be co-located or located at disparate physical server systems. For example, certain components of 5G core 139 may be co-located with components of CU 129.

In a possible O-RAN implementation, DUs 127, CU 129, 5G core 139, and/or orchestrator 138 can be implemented virtually as software being executed by general-purpose computing equipment, such as in a data center. Therefore, depending on needs, the functionality of a DU, CU, and/or 5G core may be implemented locally to each other and/or specific functions of any given component can be performed by physically separated server systems (e.g., at different server farms). For example, some functions of a CU may be located at a same server facility as where the DU is executed, while other functions are executed at a separate server system. In the illustrated embodiment of system 100, cloud-based cellular network components 128 include CU 129, 5G core 139, and orchestrator 138. Such cloud-based cellular network components 128 may be executed as specialized software executed by underlying general-purpose computer servers. Cloud-based cellular network components 128 may be executed on a third-party cloud-based computing platform or a cloud-based computing platform operated by the same entity that operates the RAN. A cloud-based computing platform may have the ability to devote additional hardware resources to cloud-based cellular network components 128 or implement additional instances of such components when requested.

Components such as DUs 127, CU 129, orchestrator 138, and 5G core 139 may include various software components that are required to communicate with each other, handle large volumes of data traffic, and are able to properly respond to changes in the network. In order to ensure not only the functionality and interoperability of such components, but also the ability to respond to changing network conditions and the ability to meet or perform above vendor specifications, significant testing must be performed.

Kubernetes, or some other container orchestration platform, can be used to create and destroy the logical CU or 5G core units and subunits as needed for the cellular network 120 to function properly. Kubernetes allows for container deployment, scaling, and management. As an example, if cellular traffic increases substantially in a region, an additional logical CU or components of a CU may be deployed in a data center near where the traffic is occurring without any new hardware being deployed. (Rather, processing and storage capabilities of the data center would be devoted to the needed functions.) When the need for the logical CU or subcomponents of the CU no longer exists, Kubernetes can allow for removal of the logical CU. Kubernetes can also be used to control the flow of data (e.g., messages) and inject a flow of data to various components. This arrangement can allow for the modification of nominal behavior of various layers.

The deployment, scaling, and management of such virtualized components can be managed by orchestrator 138. Orchestrator 138 can represent various software processes executed by underlying computer hardware. Orchestrator 138 can monitor cellular network 120 and determine the amount and location at which cellular network functions should be deployed to meet or attempt to meet service level agreements (SLAs) across slices of the cellular network.

A network slice functions as a virtual network operating on cellular network 120. Cellular network 120 is shared with some number of other network slices, such as hundreds or thousands of network slices. Communication bandwidth and computing resources of the underlying physical network can be reserved for individual network slices, thus allowing the individual network slices to reliably meet defined SLA parameters. By controlling the location and amount of computing and communication resources allocated to a network slice, the QoS and QoE for UE can be varied on different slices. A network slice can be configured to provide sufficient resources for a particular application to be properly executed and delivered (e.g., gaming services, video services, voice services, location services, sensor reporting services, data services, etc.). However, resources are not infinite, so allocation of an excess of resources to a particular UE group and/or application may be desired to be avoided. Further, a cost may be attached to cellular slices: the greater the amount of resources dedicated, the greater the cost to the user; thus optimization between performance and cost is desirable.

Particular network slices may only be reserved in particular geographic regions. For instance, a first set of network slices may be present at RU 125-1 and DU 127-1, a second set of network slices, which may only partially overlap or may be wholly different from the first set, may be reserved at RU 125-2 and DU 127-2.

Further, particular cellular network slices may include some number of defined layers. Each layer within a network slice may be used to define QoS parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

Figure 2:
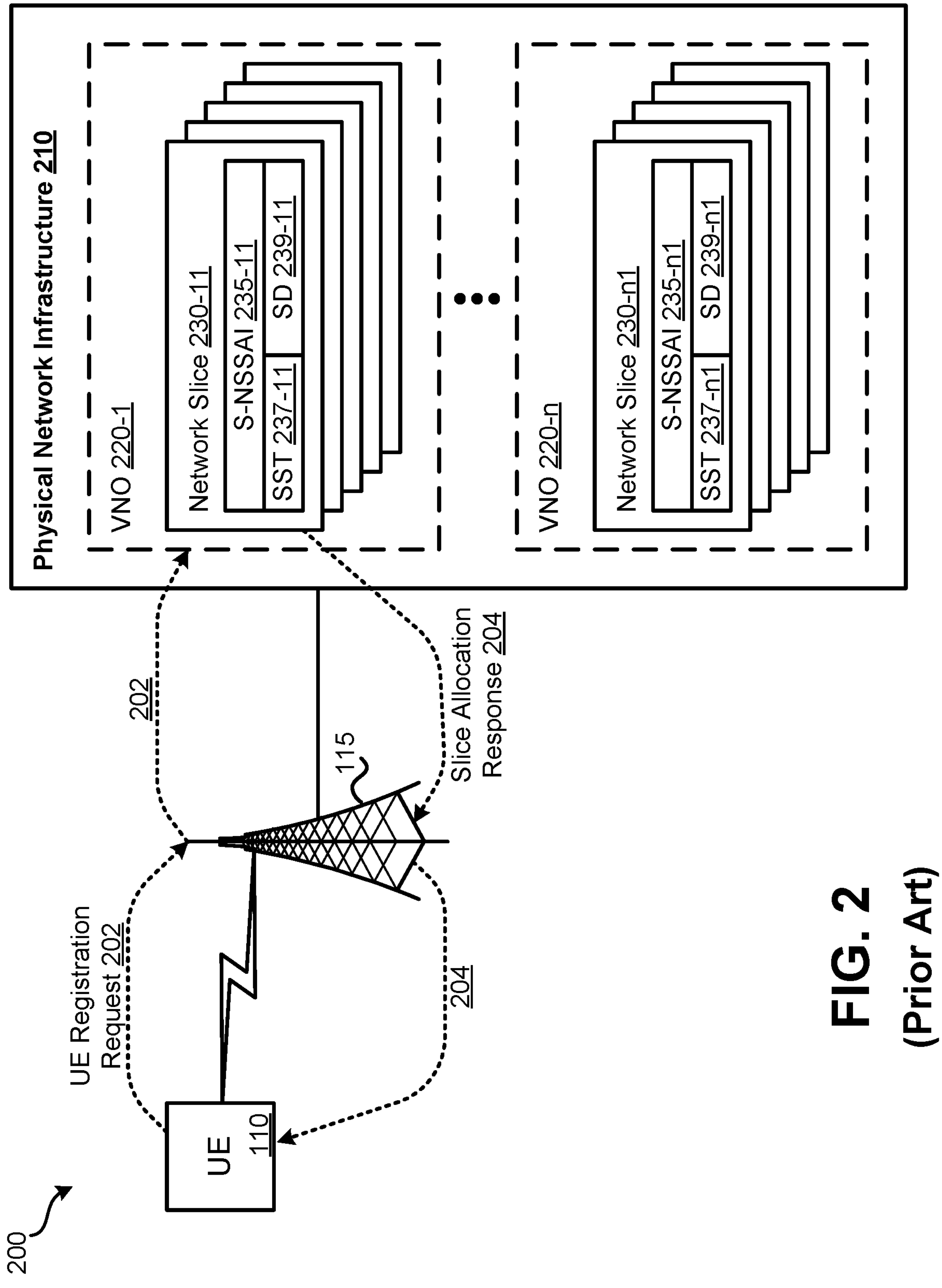
FIG. 2 (Prior Art)
FIG. 2 shows a view of a conventional embodiment of a cellular communication network.

FIG. 2 shows a view of a conventional embodiment of a cellular communication network 200. For the sake of simplicity, the conventional network 200 is shown with a single UE 110 in communication with the network infrastructure via a single tower 115. The tower 115 can generally represent a radio access network (RAN), such as an eNodeB, or the like. The network infrastructure is illustrated generally as a physical infrastructure 210 having subnetworks associated with virtual network operators (VNOs) 220. As described herein, each VNO 220 can implement multiple (e.g., a large number of) network slices 230, each supporting a standalone virtual network with its own network management, orchestration, etc. that is optimized or otherwise configured for supporting particular applications, providing particular services, etc.

UEs 110 can receive tailored communication services via the RAN and the network slices 230, but the UEs 110 and the RAN are not considered part of any network slices 230. Further, depending on the physical and logical architecture, certain network functions of the network infrastructure can be common to the network slices 230, while other network functions can be dedicated to particular network slices 230. As one example, the network infrastructure can include a number of common network functions, such as a network slice selection function (NSSF) and a network repository function (NRF). The example network infrastructure also includes a number of slice-specific functions, such as each network slice 230 having its own instance of a session management function (SMF) to provide the slice with management functions, and its own instance of a user plane function (UPF) to provide a respective tailored data network via the network slice 230. Some network functions can be common from the UE 110 side, but slice-specific from the network side, or vice versa. For example, the example network infrastructure may dedicate different instances of an access and mobility management function (AMF) to different network slices 230, but the AMF may be a common node from the perspective of any particular UE 110.

According to some network standards, the behavior of a network slice 230 is realized by a network slice instance (NSI), which is an activated network slice. Each NSI can include one or more network slice subnet instances (NSSIs), such as one or more core network NSSIs and one or more access network NSSIs. Each network slice can be uniquely identified. In the illustrated conventional network 200, each network slice is uniquely identified by a single-network slice selection assistance information (S-NSSAI) identifier 235. The S-NSSAI 235 includes two portions: a slice/service type (SST) portion 237 and a slice differentiator (SD) portion 239. Example schemas for defining network slice identifiers in context of 5G networks are discussed in TS 23.501 as promulgated by 3GPP.

Each VNO 220 can offer a collection of network services defined by a public land mobile network (PLMN). According to the PLMN, each UE 110 can be provisioned with a "configured NSSAI," which can correspond to a collection of S-NSSAIs 235. When a UE 110 desires to establish a communication session over the illustrated conventional network 200, the UE 110 can derive a "requested" NSSAI from its configured NSSAI. The UE 110 can send a UE registration request message 202 to the RAN (e.g., to cell tower 115), identifying the requested NSSAI. The RAN can be aware of which AMFs support which network slices 230, and the RAN can select an appropriate AMF to support the requested NSSAI, accordingly. The AMF can derive an "allowed" NSSAI (e.g., and a "rejected" NSSAI) on its own, or in conjunction with the NSSF. Information about the allowed and rejected NSSAIs is sent back to the UE 110. The UE 110 can then request and establish one or more PDU sessions over one or more of the S-NSSAIs 235 of the allowed NSSAI.

As described herein, each network slice 230 can be configured by the VNO 220 to be tailored to a particular type of service, application, etc. For example, when the UE 110 requests to establish a PDU session for a particular application, the request can indicate a particular S-NSSAI 235 (of the allowed NSSAI) that is most suitable for, tailored for, or otherwise appropriate for that application. For example, each VNO 220 can create and manage a large number of network slices 230, each tailored for a particular service type (indicated by the SST portion 237 of the S-NSSAI 235) and for a particular tenant or type of tenant (indicated by the SD portion 239 of the S-NSSAI 235). The tenant or type of tenant can be a category of subscribers, an enterprise customer, etc.

Figure 3:
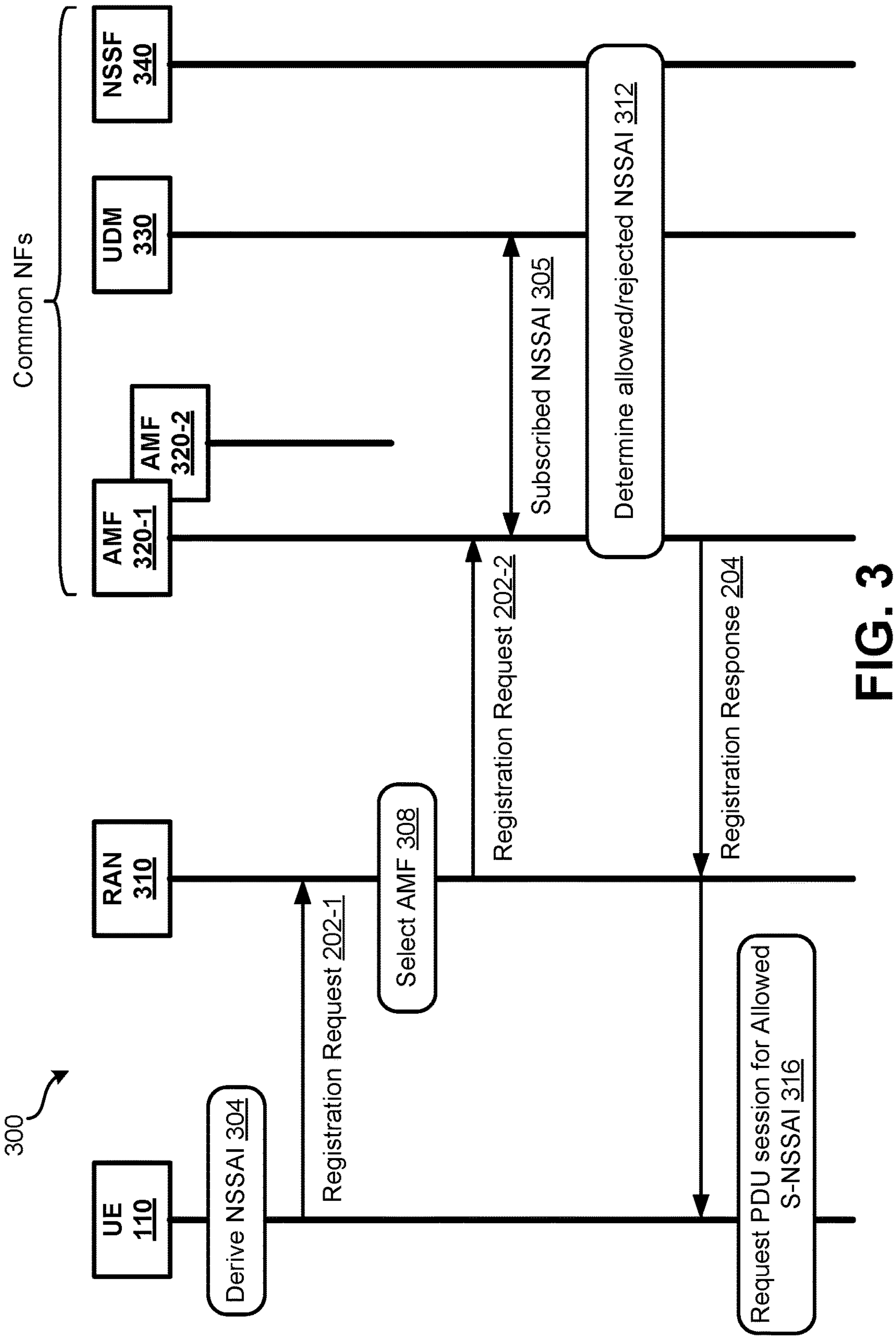
FIG. 3 (Prior Art)
FIG. 3 shows an illustrative flow diagram for conventional UE registration on a cellular network, according to several embodiments.

FIG. 3 shows an illustrative flow diagram 300 for conventional UE network slice registration in a cellular network. A portion of the cellular network is shown to include a UE 110, a RAN 310, and common network functions (at least from the perspective of the UE 110). The common network functions can include at least one or more AMFs 320, a unified data management (UDM) function 330, and a network slice selection function (NSSF) 340.

Embodiments begin at stage 304 by the UE 110 deriving a "requested" NSSAI from its configured NSSAI. For example, each VNO 220 can offer a collection of network services defined by a public land mobile network (PLMN). According to the PLMN, each UE 110 can be provisioned with a "configured NSSAI," which can correspond to a collection of S-NSSAIs 235. The UE 110 can then derive its requested NSSAI from the configuration of the PLMN. The UE 110 can then send a UE registration request message 202-1 to the RAN 310. At stage 308, the RAN 310 can select an appropriate AMF 320. For example, the RAN 310 is aware of which network slices 230 are supported by each AMF 320 based on information exchanged during an "N2/NG" setup procedure, or the like. Thus, the RAN 310 can select an appropriate AMF 320 based on the set of S-NSSAIs that correspond to the requested NSSAI and based on the RAN's 310 knowledge of which of those S-NSSAIs are supported by which AMF 320.

At stage 312, the AMF 320 can determine one or more "allowed" NSSAIs and/or one or more "rejected" NSSAIs. In some cases, the AMF 320 can make this determination on its own. In other cases, the AMF 320 makes this determination based on interrogating the NSSF 340. In some cases, the AMF 320 communicates and received subscription messages 305 with the UDM 330 to determine to which NSSAIs the UE 110 is subscribed. As described above, each allowed (and/or rejected) NSSAI includes a set of corresponding S-NSSAIs 235. The AMF can communicate a UE registration response message 204 (e.g., a slice allocation message, etc.) back to the UE 110 via the RAN 310. The UE registration response message 204 indicates the allowed and/or rejected NSSAIs. Based on the UE registration response message 204, at stage 316, the UE 110 can request establishment of a communication session via one or more network slices 230. For example, the UE 110 can request a so-called "PDU session," to provide end-to-end connectivity between the UE 110 and the specific data network or group of data networks that is implemented via the user plane function (UPF) or group of UPFs corresponding to a S-NSSAI 235.

In the above registration process, the UE 110 is registering with an RA that includes one or more TAs. The result is the UE 110 being informed of a set of allowed and rejected NSSAIs (and corresponding sets of S-NSSAIs 235) for the RA. The assumption, according to conventional standards, is that the allowed or rejected status of a particular NSSAI (or S-NSSAI) holds across all TAs of the RA. In some cases, however, for that assumption to be realized, the VNOs 220 may be forced to reduce the size of the RA to include only those TAs that have a homogeneous set of allowed and rejected NSSAIs.

Figure 4A:
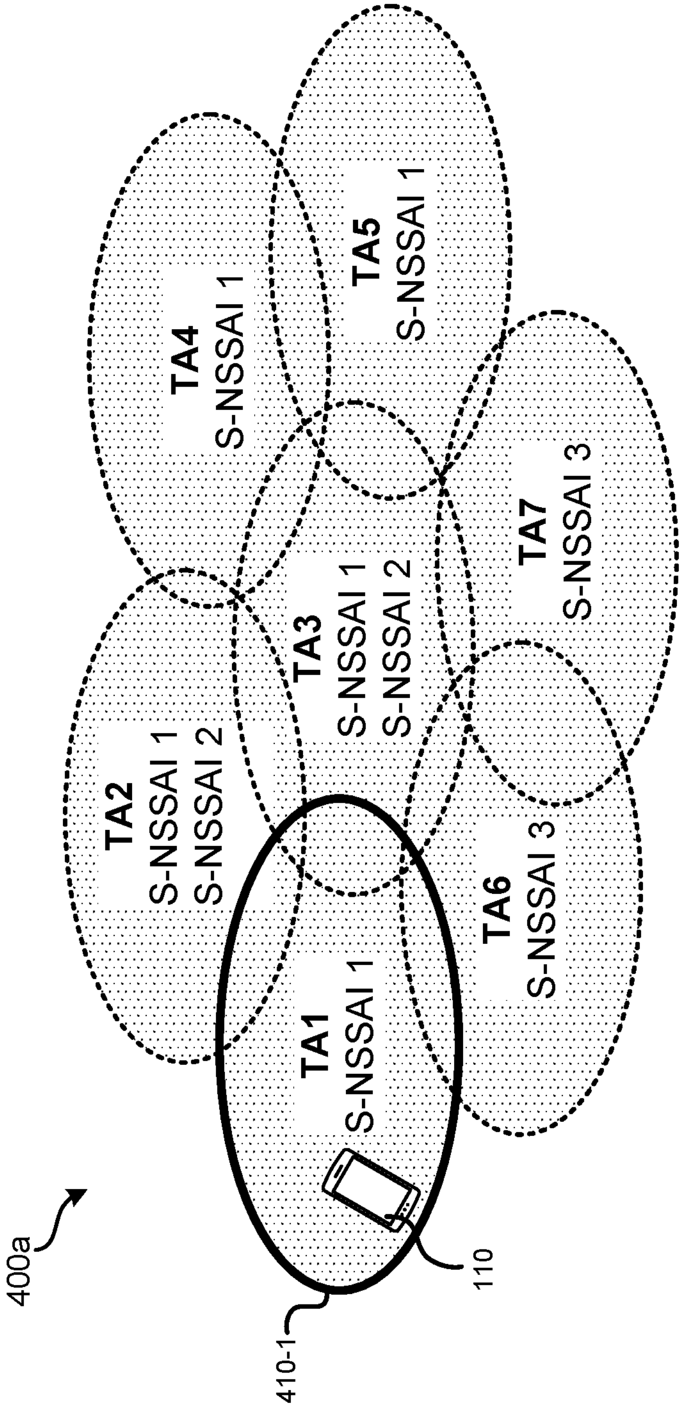
FIGS. 4A-4C show a simplified illustration of a partial cellular network infrastructure including a number of tracking areas (TA), each supporting one or more network slices.
Figure 4B:
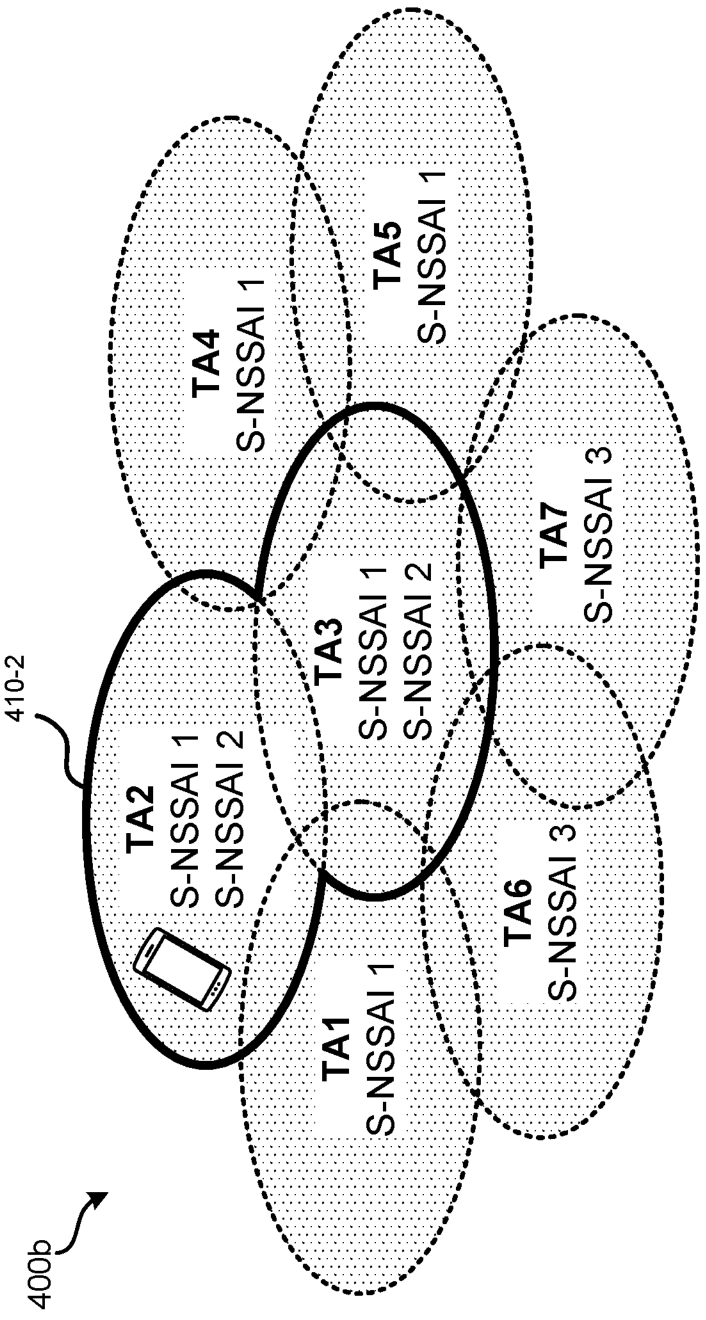
Figure 4C:
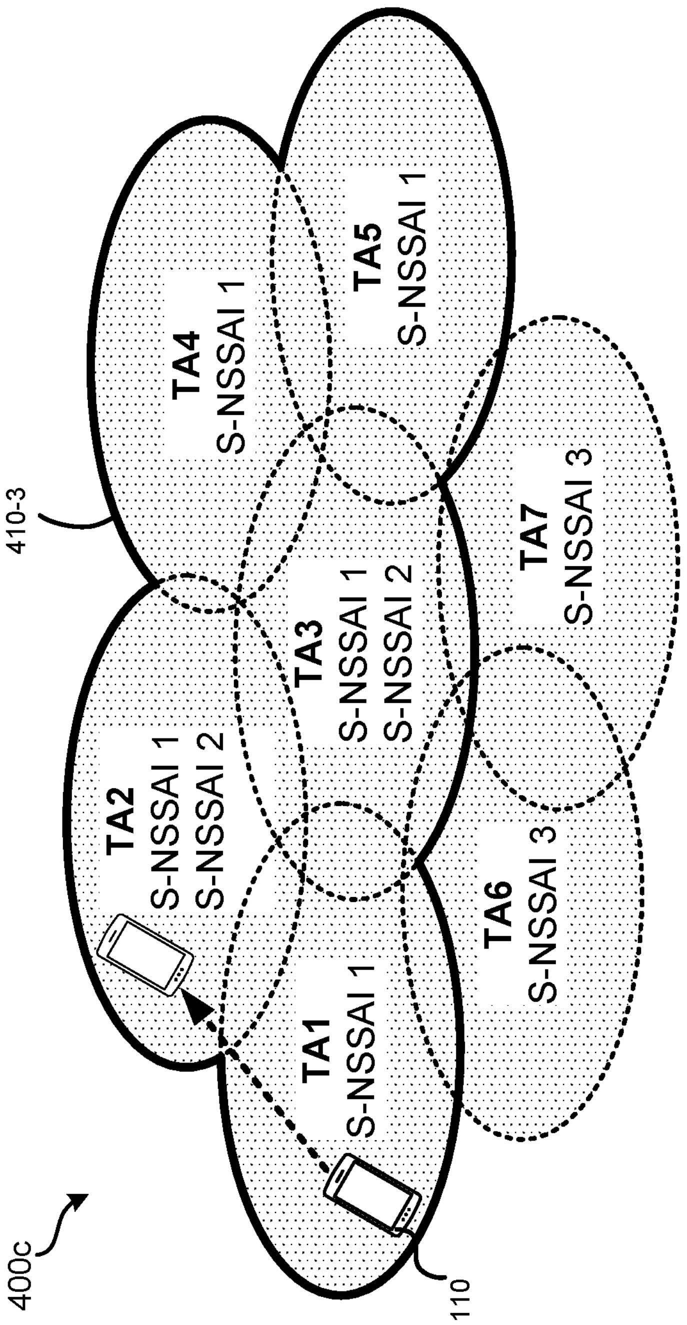

For example, FIGS. 4A-4C show a simplified illustration of a partial cellular network infrastructure 400 including a number of tracking areas (TA), each supporting one or more S-NSSAIs. As illustrated, TA1, TA4, and TA5 support only S-NSSAI 1; TA2 and TA3 support both S-NSSAI 1 and S-NSSAI 2; and TA6 and TA7 only support S-NSSAI 3. Notably, all of TA1-TA5 support S-NSSAI 1.

FIGS. 4A and 4B illustrate two examples of RA formation according to standards that require network slice homogeneity across the RA (e.g., according to the method of FIG. 3). Turning first to FIG. 4A, a UE 110 is illustrated as being in TA1 when it sends a registration request to the network for both S-NSSAI1 and S-NSSAI 2. According to standards that require network slice homogeneity across the RA, the AMF may establish the RA only to include TA1 (as indicated by region 410-1). The AMF may then respond to the UE 110 with an indication that S-NSSAI 1 is allowed, and S-NSSAI 2 is rejected. If the UE 110 moves to any other TA, it will need to re-register, and the AMF will need to stablish a new RA. FIG. 4B illustrates another example in which the UE 110 is in TA2 when it sends the registration request to the network for both S-NSSAI 1 and S-NSSAI 2. According to standards that require network slice homogeneity across the RA, the AMF may now establish the RA to include TA2 and TA3 (as indicated by region 410-2). The AMF may then respond to the UE 110 with an indication that both S-NSSAI 1 and S-NSSAI 2 are allowed. If the UE 110 moves to any other TA, it will need to re-register, and the AMF will need to stablish a new RA.

FIG. 4C illustrates another example in which network slice non-homogeneity is permitted according to conventional standards. In FIG. 4C, the UE 110 is in TA1 when it sends a registration request to the network for both S-NSSAI 1 and S-NSSAI 2. According to such conventional standards permitting network slice non-homogeneity, the AMF may establish the RA to include all of TA1-TA5 (as indicated by region 410-3). Even though S-NSSAI 2 is available in part of the RA, it is not available in the present TA (TA1) from which the registration request was made. According to some conventional standards, even though S-NSSAI 2 available in at least one TA of the RA, S-NSSAI 2 will presently be indicated as rejected to the UE 110 because it is not supported by the present TA of the UE 110 (TA1). The associated cause code sent to indicate the rejection of S-NSSAI 2 will also indicates to the UE 110 that the UE 110 is not allowed to try to register the S-NSSAI again in any of the TAs of the RA. For example, if the UE 110 subsequently moves to TA2 (as indicated by the dashed arrow), the UE 110 will not be allowed even to attempt session establishment on S-NSSAI 2, even though S-NSSAI 2 is supported in TA2. Such conventional approaches tend to be limited by a trade-off between optimizing the RA (e.g., considering the trade-off between paging load versus the load generated due to re-registration requests) and allowing the UE to register as soon as possible with the S-NSSAI that was not supported in the TA (where the S-NSSAI was not available and was therefore not allowed).

It can be desirable, then, to optimize the RA without limiting the ability of UEs to request available S-NSSAIs in any TA, even when those S-NSSAIs are not uniformly available across all TAs of the RA. An alternative approach for permitting network slice non-homogeneity is for the AMF to consider S-NSSAI 2 as "conditionally" supported in the RA. According to such an approach, the AMF determines the allowed NSSAI as including all requested S-NSSAIs that are available in all TAs of the RA (i.e., only S-NSSAI 1 would be included in the allowed NSSAI in the illustrated case), the AMF determines the rejected NSSAI as including all requested S-NSSAIs that are available in none of the TAs of the RA (i.e., no S-NSSAIs would be included in a rejected NSSAI in the illustrated case), and the AMF determines a "conditional NSSAI" as including all requested S-NSSAIs that are available in at least one but fewer than all TAs of the RA (i.e., only S-NSSAI 2 would be included in the conditional NSSAI in the illustrated case). Thus, the conditional S-NSSAIs are not part of the allowed NSSAI, but are also not part of the rejected NSSAI. Instead, the AMF can communicate to the UE 110 a list of TAs (included in the present RA) where each conditional S-NSSAI is allowed. Under such an approach, when the UE 110 subsequently moves from TA1 (where it requested registration) to TA2, the UE 110 will be aware that S-NSSAI 2 is supported in TA2 and will attempt to re-register. For example, the UE 110 issues a Mobility Registration Update (MRU).

According to the preceding approach, permitting conditionally supported network slices in this manner has the benefit that the UE 110 can potentially update its registration to session with conditional network slices as it moves into TAs that support the conditional network slice. However, this approach also has limitations. For example, for the conditional S-NSSAI, mandating re-registration in all cases of conditional network slices may delay the session establishment and may involve additional signaling for the UE 110 and/or other network functions. One approach to addressing this limitation would be to allow the UE 110 to perform session establishment without re-registration for all conditional S-NSSAI; effectively treating all conditional S-NSSAIs as part of the allowed NSSAI (although with limited TA availability). However, this approach has its own limitations, particularly in cases where one or more conditional network slices is subject to NSSAA (Network Slice Specific Authentication & Authorization) and/or NSAC (Network Slice Admission Control).

Figure 5:
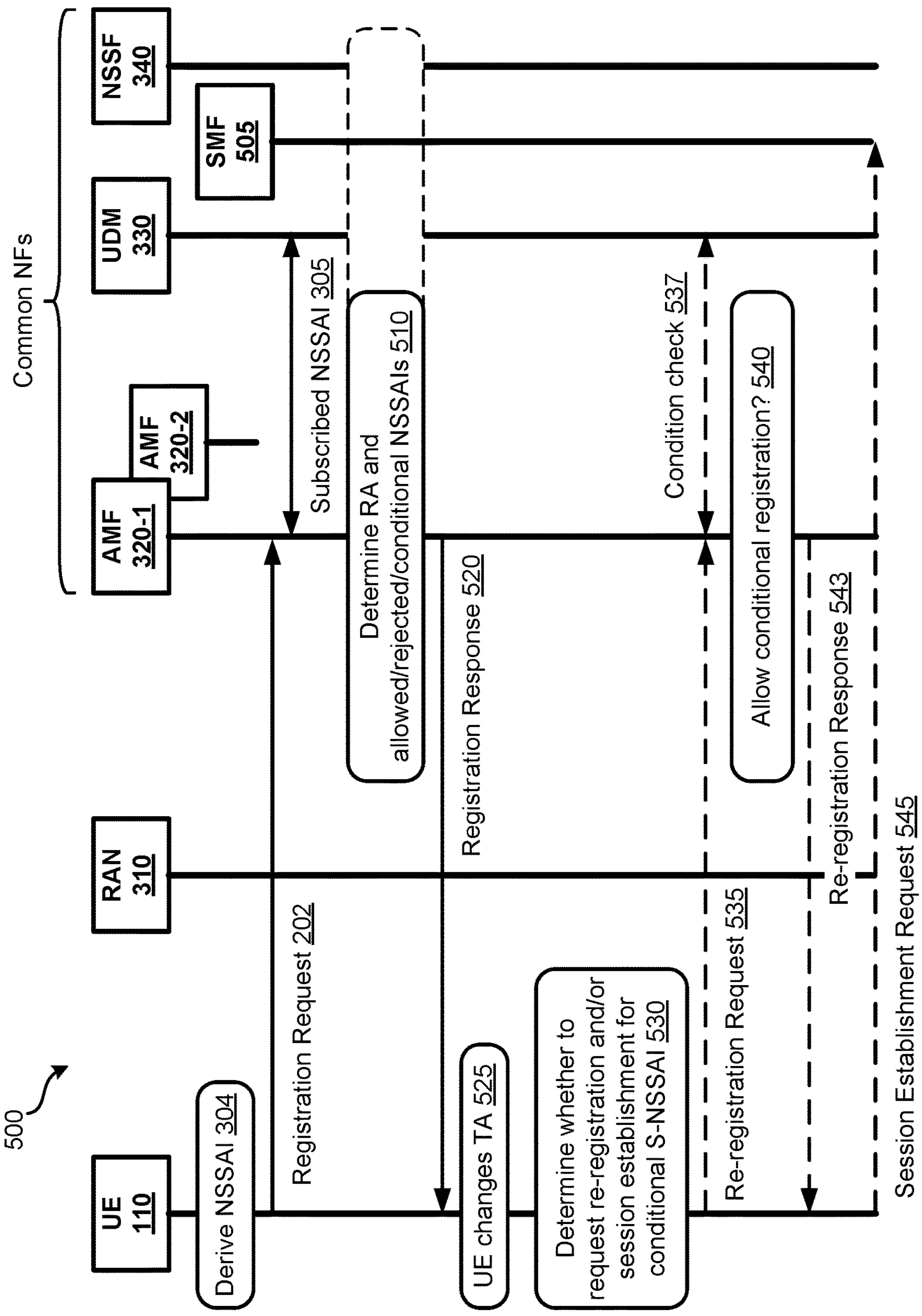
FIG. 5 shows an illustrative flow diagram for UE network slice registration in a cellular network that supports non-homogeneous registration areas, according to several embodiments.

Thus, embodiments generally provide a novel approach to handing network slice non-homogeneity in a manner that provides for tailored re-registration conditions, such as to satisfy NSSAA and/or NSAC conditions. FIG. 5 shows an illustrative flow diagram 500 for UE network slice registration in a cellular network that supports non-homogeneous registration areas, according to several embodiments described herein. A portion of the cellular network is shown to include a UE 110, a RAN 310, an AMF 320, a UDM 330, a SMF 505, and a NSSF 340. Embodiments begin by the UE 110 deriving a "requested" NSSAI from its configured NSSAI. For example, each VNO can offer a collection of network services defined by a public land mobile network (PLMN). According to the PLMN, each UE 110 can be provisioned with a "configured NSSAI," which can correspond to a collection of S-NSSAIs. The UE 110 can then derive its requested NSSAI from the configuration of the PLMN.

The UE 110 can send a UE registration request 202 (i.e., an initial mobility registration message to request connection with the network) to the AMF 320. In some cases, the UE 110 sends the registration request 202 to the RAN 310, which selects an appropriate AMF 320 and forwards the message to the selected AMF 320. The registration request 202 can include a requested NSSAI (i.e., corresponding to a list of requested S-NSSAIs). As illustrated at block 510, in response to the registration request 202, the AMF 320 can determine an appropriate RA for serving the UE 110. As described herein, the determined RA includes a number of TAs. The determination at block 510 also includes defining an allowed NSSAI, which is the subset of requested S-NSSAIs that are supported in all TAs of the RA; a rejected NSSAI, which is the subset of requested S-NSSAIs that are supported in none of the TAs of the RA; and/or a conditional NSSAI, which is the subset of requested S-NSSAIs that are supported in at least one, but fewer than all TAs of the RA. In some cases, the AMF 320 defines the NSSAIs based on its own decision making, local policies, etc. In other cases (e.g., for some types of network slices), the AMF 320 interrogates one or more other network functions. For example, the AMF 320 can exchange subscribed NSSAI messages 305 with the NSSF 340 and/or with the UDM 330 to determine which requested network slices the UE 110 is allowed to access (e.g., based on NSSAA and/or NSAC conditions). As described herein, in some cases, the evaluated conditions relate to whether any requested network slice is subject to NSSAA and/or NSAC conditions.

As illustrated in FIG. 5, the AMF 320 can send a registration response 520 back to the UE 110, informing the UE 110 of the RA and the various NSSAIs associated with the RA. For any S-NSSAI of the allowed NSSAI, the UE 110 can immediately request to establish a PDU session, or the like (e.g., as in FIG. 3). For any S-NSSAI of the rejected NSSAI, the UE 110 can never request to establish a PDU session anywhere in the RA. For any particular S-NSSAI of the conditional NSSAI, however, embodiments can enforce conditions on establishment of a session based on one or more of several factors, such as whether the particular S-NSSAI is supported in the TA from which the UE 110 initially requested registration, whether the UE 110 has moved into a TA where the particular S-NSSAI is supported, whether the particular S-NSSAI is subject to NSAC and whether the NSAC conditions are satisfied, whether the particular S-NSSAI is subject to NSSAA and whether the NSSAA conditions are satisfied, local policies of the AMF 230, etc.

For example, the registration response 520 can indicate to the UE 110 which TAs of the RA support any particular S-NSSAI of the conditional NSSAI (i.e., any particular conditional network slice). Some conditional network slices are not available in all TAs of the RA, but are also not subject to any other conditions (e.g., they are not subject to NSSAA or NSAC). In some embodiments, such conditional network slices are considered as "pre-allowed" or "partially allowed" to the UE 110. As soon as the UE 110 is in a TA that supports the network slice, it is allowed to request establishment of a session with that partially allowed conditional network slice. For example, if the conditional network slice is supported by the TA from which the UE 110 made its registration request 202, it can immediately proceed to request establishment of a session with the network slice. Or, as illustrated by block 525 of FIG. 5, the UE 110 may move to a TA where the partially allowed conditional network slice is supported. In block 530, the UE 110 determines whether a re-registration request is needed and/or whether it can request establishment of a session. In this case of a partially allowed conditional network slice, the determination at block 530 may be that no re-registration is needed, and a session establishment request 545 can be issued by the UE 110. As such, the UE 110 may send a session establishment request 545 to the network (e.g., to the SMF 505).

Other conditional network slices of the conditional NSSAI can be subject to additional conditions that determine whether and when re-registration is required by the UE 110 prior to establishing a session with that network slice. One such condition is called Network Slice Specific Authentication & Authorization (NSSAA), which refers to a technique in 5G networks that helps to tailor particular authentication and authorization conditions for particular network slices. For example, UEs may only be able to establish a session with a particular network slice when they have proper authentication and/or authorization credentials, such as when they are associated with an authorized subscriber to a particular service offered via the network slice. In cases where a conditional network slice is subject to NSSAA, there can be concern about how and/or when is appropriate time to enforce NSSAA conditions. Referring to FIG. 4C, for example, suppose S-NSSAI 2 is subject to NSSAA. If the UE 110 first requests registration from TA1 where S-NSSAI 2 is not supported, there may be no way to confirm the UE's 110 authentication and/or authorization credentials at that time. Another concern is that the NSSAA can be controlled by a third party, which can update, change, revoke, or otherwise alter authorization and/or authorization conditions associated with a network slice at any time; so it may be appropriate only to make NSSAA determinations at particular times (e.g., only once the UE 110 has entered a TA that supports the network slice). Thus, one conventional approach is to reject registration by that UE 110 for that network slice. As noted above, this can cause the UE 110 never again to request access to that network slice while in the RA.

Novel embodiments described herein can indicate to the UE 110 that the network slice is conditional (i.e., only available in particular TAs) and that the conditional network slice is associated with a re-registration condition that forces the UE 110 to re-register for the condition network slice when the UE 110 enters a TA of the RA that supports the conditional network slice. For example, the AMF will indicate to the UE 110 that S-NSSAI 2 is in the conditional NSSAI, and the UE 110 will be aware (e.g., based on explicit indications by the AMF, or based on other information) that S-NSSAI 2 is presently not available and will require re-registration and satisfaction of the NSSAA conditions. If the UE 110 moves into TA2, the UE 110 will request re-registration (e.g., the UE 110 will communicate a MRU to the AMF), and the NSSAA conditions will be evaluated at that time to determine whether to allow the UE 110 to establish a session.

For example, referring back to FIG. 5, the UE 110 moves to a TA where the conditional network slice is supported in block 525. In block 530, the UE 110 determines whether a re-registration request is needed and/or whether it can request establishment of a session. In this case, re-registration is needed in order to check whether the NSSAA conditions are presently satisfied. As illustrated, the UE 110 can send a re-registration request 535 (e.g., a MRU) to the AMF 320, and the AMF 320 can send condition check messages 537 to one or more network functions to determine whether the NSSAA conditions are presently satisfied. If not, the AMF 320 can determine at block 540 to reject the re-registration request for that conditional network slice. If so, the AMF 320 can determine at block 540 to allow the re-registration request for that conditional network slice. The AMF 320 can send back a re-registration response 543 to the UE 110 to indicate the results of the determination at block 540. If the re-registration request was allowed, the UE 110 can then send a session establishment request 545.

Another category of condition to which a conditional network slice may be subject is called Network Slice Admission Control (NSAC). NSAC refers to a technique in 5G networks that helps to control admission of UEs 110 to network slices based on availability-related conditions, as opposed to conditions relating to authorization and authentication. Some NSAC conditions can relate to resource availability (e.g., bandwidth, storage and/or computational capacity, etc.), resource compatibility (e.g., supported RAN and/or network function technologies, etc.), service level agreements, performance assurance (e.g., continued satisfaction of performance guarantees, quality of service (QoS) commitments, etc.), etc. These and/or other NSAC conditions can effectively associate particular network slices with particular threshold numbers of concurrent UEs and/or concurrent numbers of established sessions utilizing the network slice. For example, a particular network slice may be subject to NSAC for a maximum number of users, such that only 1,000 users can have active sessions on that particular network slice at any particular time. In cases where a conditional network slice is subject to NSAC, there can be concern about how and/or when is appropriate time to enforce NSAC conditions. Referring to FIG. 4C, for example, suppose S-NSSAI 2 is subject to NSAC for a maximum number of users. If the UE 110 first requests registration from TA1 where S-NSSAI 2 is not supported (i.e., the UE 110 cannot attempt to access the conditional network slice from TA1 anyway), conventional approaches may not determine at that time whether the maximum number of users has been exceeded at that time, and they may reject registration by that UE 110 for that network slice. As noted above, this can cause the UE 110 never again to request access to that network slice while in the RA.

As described more fully below, novel embodiments described herein can indicate to the UE 110 that the network slice is conditional (i.e., only available in particular TAs) and that the conditional network slice is associated with a re-registration condition that determines whether to force the UE 110 to re-register for the condition network slice when the UE 110 enters a TA of the RA that supports the conditional network slice. According to some embodiments, the network waits to evaluate the NSAC conditions for a conditional network slice until the UE 110 enters a TA that supports the conditional network slice. For example, the AMF will indicate to the UE 110 that S-NSSAI 2 is in the conditional NSSAI, and the UE 110 will be aware (e.g., based on explicit indications by the AMF, or based on other information) that S-NSSAI 2 is presently not available and will require re-registration subject to evaluation of NSAC. If the UE 110 moves into TA2, the UE 110 will request re-registration (e.g., the UE 110 will communicate a MRU to the AMF), and the NSAC conditions will be evaluated at that time to determine whether to allow the UE 110 to establish a session.

For example, referring back to FIG. 5, the UE 110 moves to a TA where the conditional network slice is supported in block 525. In block 530, the UE 110 determines that a re-registration request is needed because the network waited to evaluate the NSAC conditions at the time of initial registration. Accordingly, the UE 110 can send a re-registration request 535, and the AMF 320 can send condition check messages 537 to one or more network functions to determine whether the NSAC conditions are presently satisfied. The AMF 320 can allow or reject the re-registration request accordingly at block 540 and can send back a corresponding re-registration response 543 to the UE 110. If the re-registration request was allowed (i.e., if the NSAC conditions were determined to be satisfied), the UE 110 can then send a session establishment request 545.

According to other embodiments, the network can evaluate the NSAC condition at the time of the initial mobility registration by the UE 110, and the network can either pre-allow the UE 110 if the conditions are met (e.g., the maximum number of users has not been met or exceeded), or pre-reject the UE 110 if the conditions are not met (e.g., maximum number of users has already been met or exceeded). In such cases, if the UE 110 was pre-allowed, the UE 110 will still be forced to re-register when entering a TA that supports the conditional network slice, but the NSAC condition will not need to be reevaluated at that time (as it was already evaluated at the time of the initial registration that caused generation of the RA). However, if the UE 110 was pre-rejected, the UE 110 will not try to re-register even when entering a TA that supports the conditional network slice because the NSAC conditions were not met (even though evaluation of the NSAC condition may have changed between the time of initial mobility registration in TA1 and a time at which the UE 110 moved to TA2).

For example, referring back to FIG. 5, the UE 110 moves to a TA where a pre-allowed (e.g., partially allowed) conditional network slice subject to NSAC is supported in block 525. In block 530, the UE 110 determines that a re-registration request is not needed because the network already pre-evaluated the NSAC conditions at the time of initial registration and found them to be satisfied. Accordingly, the UE 110 can immediately send a session establishment request 545.

According to other embodiments, the network can evaluate the NSAC condition at the time of the initial mobility registration by the UE 110. If the NSAC conditions are found to be met, the re-registration condition will indicate that the UE 110 is pre-allowed; the UE 110 will still be forced to re-register when entering a TA that supports the conditional network slice, but the NSAC condition will not need to be reevaluated at that time (as it was already evaluated at the time of the initial registration that caused generation of the RA). If the NSAC conditions are found not to be met, the re-registration condition will indicate that the conditional network slice is presently not available and will require re-registration subject to re-evaluation of NSAC at that time. For example, if the UE 110 moves into TA2, the UE 110 will request re-registration regardless of whether the UE 110 was pre-allowed, but the NSAC conditions will only be re-evaluated at that time if the UE 110 was not pre-allowed.

For example, referring back to FIG. 5, the UE 110 moves to a TA where the conditional network slice subject to NSAC is supported in block 525. In block 530, the UE 110 determines whether a re-registration request is needed based on whether the network slice was pre-allowed or pre-rejected. In the case of a pre-allowed conditional network slice subject to NSAC, the UE 110 determines that a re-registration request is not needed because the network already pre-evaluated the NSAC conditions at the time of initial registration and found them to be satisfied. Accordingly, the UE 110 can immediately send a session establishment request 545. In the case of a pre-rejected conditional network slice subject to NSAC, the UE 110 determines that a re-registration request is needed to re-evaluate the NSAC conditions and determine whether they can now be satisfied. Accordingly, the UE 110 can send a re-registration request 535, and the AMF 320 can send condition check messages 537 to one or more network functions to determine whether the NSAC conditions are presently satisfied. The AMF 320 can allow or reject the re-registration request accordingly at block 540 and can send back a corresponding re-registration response 543 to the UE 110. If the re-registration request is now allowed (i.e., if the NSAC conditions were determined to be satisfied), the UE 110 can then send a session establishment request 545. If the NSAC conditions are still not satisfied, the re-registration request is denied and a session establishment request 545 is not sent.

Figure 6:
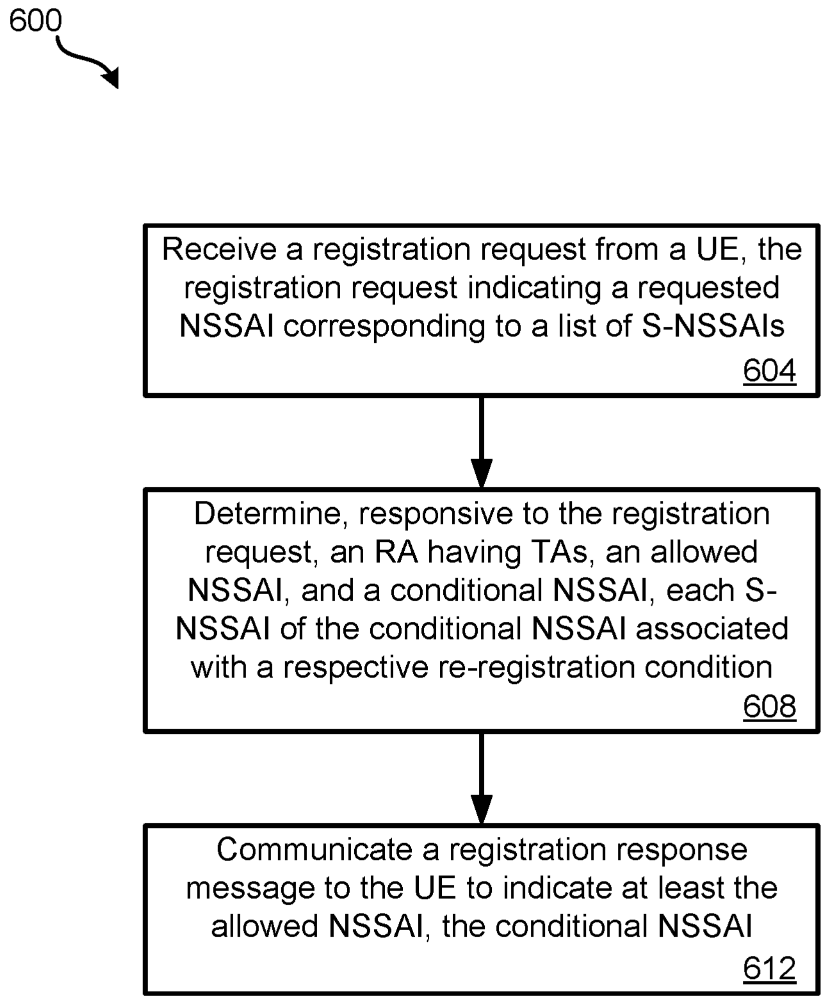
FIG. 6 shows a flow diagram of an illustrative method for non-homogeneous network slice support over a registration area of a cellular communication network infrastructure, according to several embodiments described herein.

FIG. 6 shows a flow diagram of an illustrative method 600 for non-homogeneous network slice support over a registration area of a cellular communication network infrastructure, according to several embodiments described herein. Embodiments of the method 600 can operate in context of a 5G cellular network infrastructure. The method 600 can begin at stage 604 by receiving a registration request from a user equipment device (UE) by an access and mobility management function (AMF) of the cellular communication network infrastructure. The registration request indicate a requested network slice selection assistance information (NSSAI) corresponding to a list of single-NSSAIs (S-NSSAIs). For example, the requested list of S-NSSAIs can correspond to a derived NSSAI.

At stage 608, embodiment can determine (e.g., by the AMF), responsive to the registration request, a registration area (RA) as having several tracking areas (TAs). The manner by which the AMF forms the RA and selects which TAs to include is defined in 5G technical specification. The determination at stage 608 also includes determining an allowed NSSAI corresponding to a first subset of the S-NSSAIs (the requested S-NSSAIs) that are supported in all of the TAs of the RA. The determination at stage 608 also includes determining a conditional NSSAI corresponding to a second subset of the S-NSSAIs that are supported in only a subset of the TAs of the RA (i.e., in at least one, but fewer than all TAs). Each particular S-NSSAI of the conditional NSSAI is associated with a respective re-registration condition that defines whether the particular S-NSSAI is allowed for access by the UE without re-registration in TAs of the RA where the particular S-NSSAI is supported. In some cases, the determination at stage 608 also includes determining a rejected NSSAI corresponding to a third subset of the S-NSSAIs (the requested S-NSSAIs) that are supported in none of the TAs of the RA. Determination of which S-NSSAIs to include in each NSSAI can be performed in some cases by the AMF. In other cases, the AMF can exchange information messages with one or more other shared network functions when making such a determination. For example, other network functions can provide information about whether the UE is subscribed to particular services, whether network resources are presently available or limited, and/or other information that can impact determinations regarding network slice allocations and permissions.

In some embodiments, at stage 608, determining the RA further includes determining a present TA corresponding to a present location of the UE upon the receiving the registration request. Such embodiments can also include determining, for each particular S-NSSAI of the second set of the S-NSSAIs, whether the particular S-NSSAI is supported by the present TA and whether the particular S-NSSAI is subject to NSAC. In such embodiments, the respective re-registration condition can be determined for each particular S-NSSAI of the second set of the S-NSSAIs based on whether the particular S-NSSAI is supported by the present TA and whether the particular S-NSSAI is subject to NSAC. In some such embodiments, determining the respective re-registration condition for each particular S-NSSAI at stage 608 includes, responsive to determining that the particular S-NSSAI is supported by the present TA and is not subject to NSAC, determining the respective re-registration condition to define that the particular S-NSSAI is allowed for immediate session establishment by the UE in the present TA.

Some such embodiments can also include determining the respective re-registration condition for each particular S-NSSAI by, responsive to determining that the particular S-NSSAI is supported by the present TA and is subject to NSAC: determining whether an admission threshold associated with the NSAC is presently exceeded; determining the respective re-registration condition, responsive to determining that the admission threshold is presently not exceeded, to define that the particular S-NSSAI is allowed for immediate session establishment by the UE in the present TA; and determining the respective re-registration condition, responsive to determining that the admission threshold is presently exceeded, to define that the particular S-NSSAI is not allowed for access by the UE in the present TA and that re-registration by the UE is required prior to accessing the particular S-NSSAI in other TAs of the RA where the particular S-NSSAI is supported. For example, the admission threshold can be based on a maximum number of UEs and/or a maximum number of sessions associated with the particular S-NSSAI.

Some such embodiments can also include determining the respective re-registration condition for each particular S-NSSAI by, responsive to determining that the particular S-NSSAI is not supported by the present TA and is subject to NSAC: determining whether an admission threshold associated with the NSAC is presently exceeded; determining the respective re-registration condition, responsive to determining that the admission threshold is presently not exceeded, to define that the particular S-NSSAI is allowed for access by the UE without re-registration in TAs of the RA where the particular S-NSSAI is supported; and determining the respective re-registration condition, responsive to determining that the admission threshold is presently exceeded, to define that the particular S-NSSAI is not allowed for access by the UE in the present TA and that re-registration by the UE is required prior to accessing the particular S-NSSAI in other TAs of the RA where the particular S-NSSAI is supported.

Some such embodiments can also include, responsive to determining that the particular S-NSSAI is not supported by the present TA, determining the respective re-registration condition to define that the particular S-NSSAI is not allowed for access by the UE without re-registration in TAs of the RA where the particular S-NSSAI is supported, regardless of whether the particular S-NSSAI is subject to NSAC. Some such embodiments can also include, responsive to determining that the particular S-NSSAI is not supported by the present TA and is not subject to NSAC, determining the respective re-registration condition to define whether the particular S-NSSAI is allowed for access by the UE without re-registration in TAs of the RA where the particular S-NSSAI is supported based on a local policy of the AMF.

In some embodiments, at stage 608, determining the RA further includes: determining a present TA corresponding to a present location of the UE upon the receiving the registration request; determining, for each particular S-NSSAI of the second set of the S-NSSAIs, whether the particular S-NSSAI is supported by the present TA and whether the particular S-NSSAI is subject to NSSAA; and determining the respective re-registration condition for each particular S-NSSAI of the second set of the S-NSSAIs based on whether the particular S-NSSAI is supported by the present TA and whether the particular S-NSSAI is subject to NSSAA. In some such embodiments, determining the respective re-registration condition for each particular S-NSSAI includes, responsive to determining that the particular S-NSSAI is supported by the present TA and is not subject to NSSAA, determining the respective re-registration condition to define that the particular S-NSSAI is allowed for immediate session establishment by the UE in the present TA.

In some such embodiments, determining the respective re-registration condition for each particular S-NSSAI includes, responsive to determining that the particular S-NSSAI is supported by the present TA and is subject to NSSAA: determining whether the UE satisfies specific authentication and authorization parameters for the particular S-NSSAI as defined by the NSSAA; determining the respective re-registration condition, responsive to determining that the specific authentication and authorization parameters are satisfied, to define that the particular S-NSSAI is allowed for immediate session establishment by the UE in the present TA; and determining the respective re-registration condition, responsive to determining that the specific authentication and authorization parameters are not satisfied, to define that the particular S-NSSAI is not allowed for access by the UE in the present TA and that re-registration by the UE is required prior to accessing the particular S-NSSAI in other TAs of the RA where the particular S-NSSAI is supported.

In some such embodiments, determining the respective re-registration condition for each particular S-NSSAI includes, responsive to determining that the particular S-NSSAI is not supported by the present TA and is subject to NSSAA: determining whether the UE satisfies specific authentication and authorization parameters for the particular S-NSSAI as defined by the NSSAA; determining the respective re-registration condition, responsive to determining that the specific authentication and authorization parameters are satisfied, to define that the particular S-NSSAI is allowed for access by the UE without re-registration in TAs of the RA where the particular S-NSSAI is supported; and determining the respective re-registration condition, responsive to determining that the specific authentication and authorization parameters are not satisfied, to define that the particular S-NSSAI is not allowed for access by the UE in the present TA and that re-registration by the UE is required prior to accessing the particular S-NSSAI in other TAs of the RA where the particular S-NSSAI is supported.

Some such embodiments include, responsive to determining that the particular S-NSSAI is not supported by the present TA, determining the respective re-registration condition to define that the particular S-NSSAI is not allowed for access by the UE without re-registration in TAs of the RA where the particular S-NSSAI is supported, regardless of whether the particular S-NSSAI is subject to NSSAA. Some such embodiments include, responsive to determining that the particular S-NSSAI is not supported by the present TA and is not subject to NSSAA, determining the respective re-registration condition to define whether the particular S-NSSAI is allowed for access by the UE without re-registration in TAs of the RA where the particular S-NSSAI is supported based on a local policy of the AMF.

At stage 612, embodiments can communicate a registration response message (e.g., by the AMF) to the UE to indicate at least the allowed NSSAI and the conditional NSSAI. The conditional NSSAI and the conditions associated therewith can be communicated in any suitable manner. In some embodiments, the registration response message includes an explicit indication (e.g., a list), for each S-NSSAI of the conditional NSSAI, which of the TAs of the RA support the S-NSSAI and/or which do not.

In some embodiments, the registration response message further includes an explicit indication of the re-registration condition associated with each S-NSSAI of the conditional NSSAI. For example, each respective re-registration condition is an explicit indication by the AMF of whether the particular S-NSSAI is allowed for access by the UE in TAs of the RA where the particular S-NSSAI is supported; and the communicating at stage 612 includes communicating the explicit indication with the registration response message. In some such embodiments, the explicit indication is only an indication of whether re-registration is required prior to requesting establishment of a session. In other such embodiments, the explicit indication includes further explicit indication of whether the S-NSSAI is subject to NSSAA, NSAC, or some other specific condition.

In other embodiments, there may be no explicit indication of the re-registration condition. For example, each respective re-registration condition is an implicit indication of whether the particular S-NSSAI is allowed for access by the UE in TAs of the RA where the particular S-NSSAI is supported, the implicit indication being associated at the UE by S-NSSAI type; and the communicating at stage 612 includes communicating the registration response message without any explicit indication of the respective re-registration conditions. In such cases, the UE may be able to determine on its own whether a particular S-NSSAI of the conditional NSSAI will require re-registration. For example, the UE may be able to determine, based on characteristics of the requested network slice (e.g., a particular slice type or category), that this is a type of network slice that is subject to NSAC.

Figure 7:
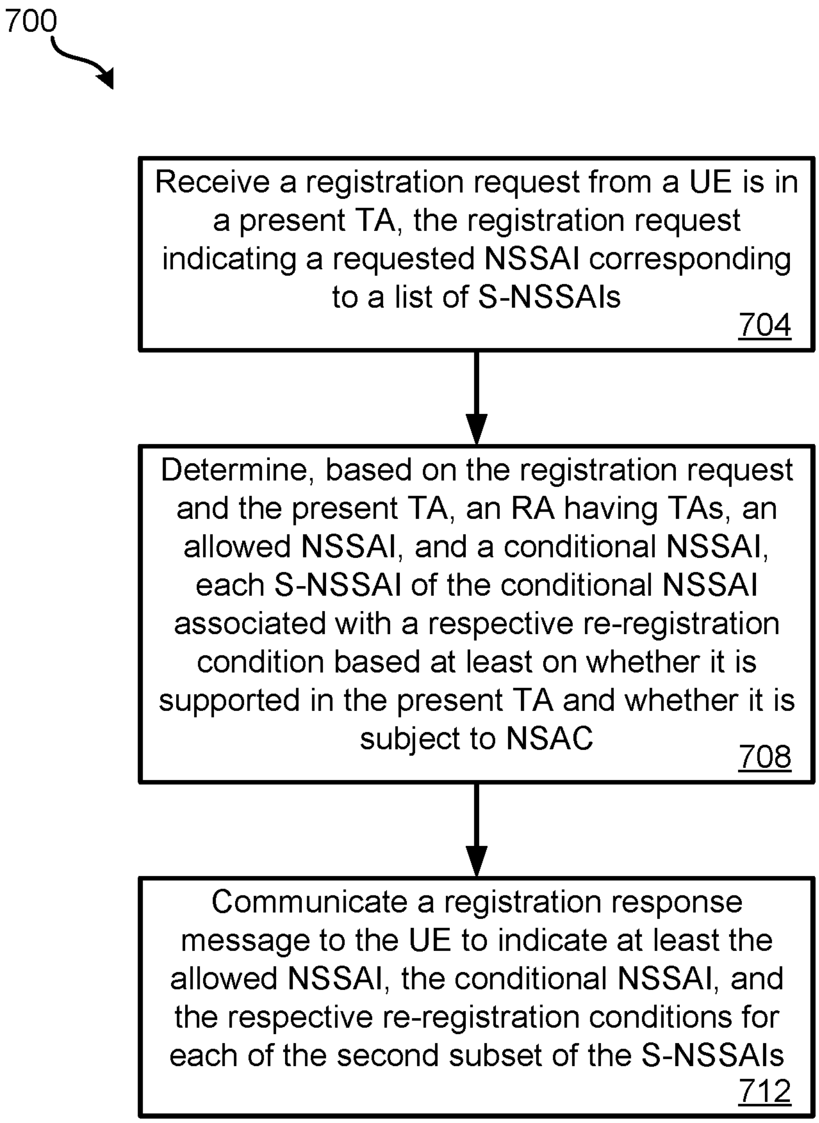
FIG. 7 shows a flow diagram of another illustrative method for non-homogeneous network slice support over a registration area of a cellular communication network infrastructure, representing a particular implementation of the method of FIG. 6.

FIG. 7 shows a flow diagram of another illustrative method 700 for non-homogeneous network slice support over a registration area of a cellular communication network infrastructure, representing a particular implementation of the method 600 of FIG. 6. The method 704 begins at stage 704 by receiving a registration request from a UE by an AMF of the cellular communication network infrastructure while the UE is in a present TA of the cellular communication network infrastructure, the registration request indicating a requested NSSAI corresponding to a list of S-NSSAIs. At stage 708, the method 700 can determine, by the AMF, based on the registration request and the present TA: a registration area (RA) having a plurality of tracking areas (TAs); an allowed NSSAI corresponding to a first subset of the S-NSSAIs that are supported in all of the TAs of the RA; and a conditional NSSAI corresponding to a second subset of the S-NSSAIs that are supported in only a subset of the TAs of the RA. Each particular S-NSSAI of the conditional NSSAI is associated with a respective re-registration condition that defines whether the particular S-NSSAI is allowed for access by the UE without re-registration in TAs of the RA where the particular S-NSSAI is supported, each respective re-registration condition being based at least on whether the particular S-NSSAI is supported in the present TA and whether the particular S-NSSAI is subject to NSAC. At stage 712, the method 700 can communicate a registration response message by the AMF to the UE to indicate at least the allowed NSSAI, the conditional NSSAI, and the respective re-registration conditions for each of the second subset of the S-NSSAIs.

Figure 8:
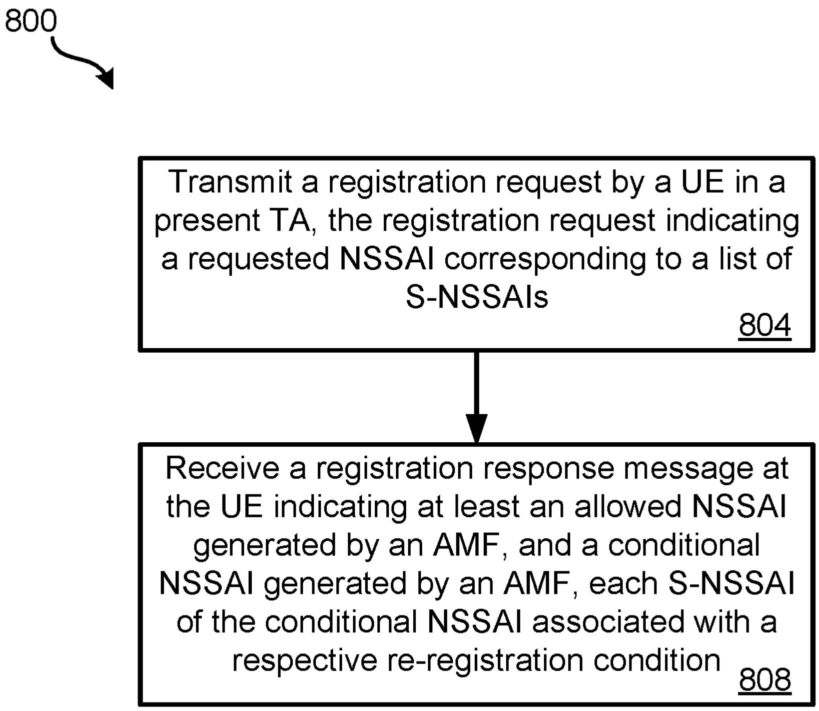
FIG. 8 shows a flow diagram of an illustrative method for non-homogeneous network slice support over a registration area of a cellular communication network infrastructure from the perspective of a requesting UE, according to several embodiments described herein.

FIG. 8 shows a flow diagram of an illustrative method 800 for non-homogeneous network slice support over a registration area of a cellular communication network infrastructure from the perspective of a requesting UE, according to various embodiments described herein. Embodiments of the method 800 can operate in a 5G cellular network infrastructure. Embodiments can begin at stage 804 by transmitting a registration request by UE to an AMF of the cellular communication network infrastructure while the UE is in a present TA of the cellular communication network infrastructure. The registration request indicates a requested NSSAI corresponding to a list of S-NSSAIs.

At stage 808, embodiments can receive a registration response message by the UE from the AMF responsive to the registration request. The registration response message indicates at least: an allowed NSSAI defining a first subset of the S-NSSAIs determined by the AMF to be supported in all of the TAs of an RA generated by the AMF; and a conditional NSSAI defining a second subset of the S-NSSAIs, each particular S-NSSAI of the conditional NSSAI determined by the AMF to be supported in only a subset of the TAs of the RA and to be associated with a respective re-registration condition that defines whether the particular S-NSSAI is allowed for access by the UE without re-registration in TAs of the RA where the particular S-NSSAI is supported. In some embodiments, each respective re-registration condition can be based at least on whether the particular S-NSSAI is supported in the present TA and whether the particular S-NSSAI is subject to Network Slice Admission Control (NSAC) and/or Network Slice Specific Authentication and Authorization (NSSAA).

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for non-homogeneous network slice support over a registration area of a cellular communication network infrastructure, the method comprising:

receiving a registration request from a user equipment device (UE) by an access and mobility management function (AMF) of the cellular communication network infrastructure, the registration request indicating a requested network slice selection assistance information (NSSAI) corresponding to a list of single-NSSAIs (S-NSSAIs);

determining, by the AMF responsive to the registration request:

a present tracking area (TA) corresponding to a present location of the UE;

a registration area (RA) as having a plurality of TAs;

an allowed NSSAI corresponding to a first subset of the S-NSSAIs that are supported in all of the TAs of the RA; and a conditional NSSAI corresponding to a second subset of the S-NSSAIs that are supported in only a subset of the TAs of the RA, each particular S-NSSAI of the conditional NSSAI being associated with a respective re-registration condition that defines whether the particular S-NSSAI is allowed for access by the UE without re-registration in TAs of the RA where the particular S-NSSAI is supported, wherein the respective re-registration condition is determined based on whether the particular S-NSSAI is supported by the present TA and whether the particular S-NSSAI is subject to Network Slice Admission Control (NSAC); and communicating a registration response message by the AMF to the UE to indicate at least the allowed NSSAI and the conditional NSSAI.

2. The method of claim 1, wherein the determining the respective re-registration condition for each particular S-NSSAI comprises, responsive to determining that the particular S-NSSAI is supported by the present TA and is not subject to NSAC, determining the respective re-registration condition to define that the particular S-NSSAI is allowed for immediate session establishment by the UE in the present TA.

3. The method of claim 1, wherein the determining the respective re-registration condition for each particular S-NSSAI comprises, responsive to determining that the particular S-NSSAI is supported by the present TA and is subject to NSAC:

determining whether an admission threshold associated with the NSAC is presently exceeded;

determining the respective re-registration condition, responsive to determining that the admission threshold is presently not exceeded, to define that the particular S-NSSAI is allowed for immediate session establishment by the UE in the present TA; and determining the respective re-registration condition, responsive to determining that the admission threshold is presently exceeded, to define that the particular S-NSSAI is not allowed for access by the UE in the present TA and that re-registration by the UE is required prior to accessing the particular S-NSSAI in other TAs of the RA where the particular S-NSSAI is supported.

4. The method of claim 1, wherein the determining the respective re-registration condition for each particular S-NSSAI comprises, responsive to determining that the particular S-NSSAI is not supported by the present TA and is subject to NSAC:

determining whether an admission threshold associated with the NSAC is presently exceeded;

determining the respective re-registration condition, responsive to determining that the admission threshold is presently not exceeded, to define that the particular S-NSSAI is allowed for access by the UE without re-registration in TAs of the RA where the particular S-NSSAI is supported; and determining the respective re-registration condition, responsive to determining that the admission threshold is presently exceeded, to define that the particular S-NSSAI is not allowed for access by the UE in the present TA and that re-registration by the UE is required prior to accessing the particular S-NSSAI in other TAs of the RA where the particular S-NSSAI is supported.

5. The method of claim 1, wherein, responsive to determining that the particular S-NSSAI is not supported by the present TA, determining the respective re-registration condition to define that the particular S-NSSAI is not allowed for access by the UE without re-registration in TAs of the RA where the particular S-NSSAI is supported, regardless of whether the particular S-NSSAI is subject to NSAC.

6. The method of claim 1, wherein, responsive to determining that the particular S-NSSAI is not supported by the present TA and is not subject to NSAC, determining the respective re-registration condition to define whether the particular S-NSSAI is allowed for access by the UE without re-registration in TAs of the RA where the particular S-NSSAI is supported based on a local policy of the AMF.

7. The method of claim 1, wherein the determining the RA further comprises:

determining, for each particular S-NSSAI of the second subset of the S-NSSAIs, whether the particular S-NSSAI is supported by the present TA and whether the particular S-NSSAI is subject to Network Slice Specific Authentication and Authorization (NSSAA); and determining the respective re-registration condition for each particular S-NSSAI of the second subset of the S-NSSAIs based on whether the particular S-NSSAI is supported by the present TA and whether the particular S-NSSAI is subject to NSSAA.

8. The method of claim 7, wherein the determining the respective re-registration condition for each particular S-NSSAI comprises, responsive to determining that the particular S-NSSAI is supported by the present TA and is not subject to NSSAA, determining the respective re-registration condition to define that the particular S-NSSAI is allowed for immediate session establishment by the UE in the present TA.

9. The method of claim 7, wherein the determining the respective re-registration condition for each particular S-NSSAI comprises, responsive to determining that the particular S-NSSAI is supported by the present TA and is subject to NSSAA:

determining whether the UE satisfies specific authentication and authorization parameters for the particular S-NSSAI as defined by the NSSAA;

determining the respective re-registration condition, responsive to determining that the specific authentication and authorization parameters are satisfied, to define that the particular S-NSSAI is allowed for immediate session establishment by the UE in the present TA; and determining the respective re-registration condition, responsive to determining that the specific authentication and authorization parameters are not satisfied, to define that the particular S-NSSAI is not allowed for access by the UE in the present TA and that re-registration by the UE is required prior to accessing the particular S-NSSAI in other TAs of the RA where the particular S-NSSAI is supported.

10. The method of claim 7, wherein the determining the respective re-registration condition for each particular S-NSSAI comprises, responsive to determining that the particular S-NSSAI is not supported by the present TA and is subject to NSSAA:

determining whether the UE satisfies specific authentication and authorization parameters for the particular S-NSSAI as defined by the NSSAA;

determining the respective re-registration condition, responsive to determining that the specific authentication and authorization parameters are satisfied, to define that the particular S-NSSAI is allowed for access by the UE without re-registration in TAs of the RA where the particular S-NSSAI is supported; and determining the respective re-registration condition, responsive to determining that the specific authentication and authorization parameters are not satisfied, to define that the particular S-NSSAI is not allowed for access by the UE in the present TA and that re-registration by the UE is required prior to accessing the particular S-NSSAI in other TAs of the RA where the particular S-NSSAI is supported.

11. The method of claim 7, wherein, responsive to determining that the particular S-NSSAI is not supported by the present TA, determining the respective re-registration condition to define that the particular S-NSSAI is not allowed for access by the UE without re-registration in TAs of the RA where the particular S-NSSAI is supported, regardless of whether the particular S-NSSAI is subject to NSSAA.

12. The method of claim 7, wherein, responsive to determining that the particular S-NSSAI is not supported by the present TA and is not subject to NSSAA, determining the respective re-registration condition to define whether the particular S-NSSAI is allowed for access by the UE without re-registration in TAs of the RA where the particular S-NSSAI is supported based on a local policy of the AMF.

13. The method of claim 1, wherein:

each respective re-registration condition is an explicit indication by the AMF of whether the particular S-NSSAI is allowed for access by the UE in TAs of the RA where the particular S-NSSAI is supported; and the communicating comprises communicating the explicit indication with the registration response message.

14. An access and mobility management function (AMF) for deployment in a cellular communication network infrastructure, the AMF comprising:

one or more network interfaces for communicating with user equipment devices (UEs) over a radio access network (RAN) of the cellular communication network infrastructure;

one or more processors coupled with the one or more network interfaces; and non-transitory memory having instructions stored thereon, which, when executed, cause the one or more processors to perform steps comprising:

receiving a registration request from a UE via the one or more network interfaces, the registration request indicating a requested network slice selection assistance information (NSSAI) corresponding to a list of single-NSSAIs (S-NSSAIs);

determining, responsive to the registration request:

a present tracking area (TA) corresponding to a present location of the UE;

a registration area (RA) as having a plurality of TAs;

an allowed NSSAI corresponding to a first subset of the S-NSSAIs that are supported in all of the TAs of the RA; and a conditional NSSAI corresponding to a second subset of the S-NSSAIs that are supported in only a subset of the TAs of the RA, each particular S-NSSAI of the conditional NSSAI being associated with a respective re-registration condition that defines whether the particular S-NSSAI is allowed for access by the UE without re-registration in TAs of the RA where the particular S-NSSAI is supported, wherein the respective re-registration condition is determined based on whether the particular S-NSSAI is supported by the present TA and whether the particular S-NSSAI is subject to Network Slice Admission Control (NSAC); and communicating a registration response message to the UE via the one or more network interfaces to indicate at least the allowed NSSAI and the conditional NSSAI.

15. The AMF of claim 14, wherein, responsive to determining that the particular S-NSSAI is supported by the present TA, is not subject to NSAC, and is not subject to Network Slice Specific Authentication and Authorization (NSSAA), the determining the respective re-registration condition for the particular S-NSSAI defines that the particular S-NSSAI is allowed for immediate session establishment by the UE in the present TA.

16. The AMF of claim 14, wherein, responsive to determining that the particular S-NSSAI is subject to NSAC, the determining the respective re-registration condition for the particular S-NSSAI is further based on determining whether an admission threshold associated with the NSAC is presently exceeded.

17. The AMF of claim 14, wherein, responsive to determining that the particular S-NSSAI is subject to NSSAA, the determining the respective re-registration condition for the particular S-NSSAI is further based on determining whether the UE satisfies specific authentication and authorization parameters for the particular S-NSSAI as defined by the NSSAA.

18. The AMF of claim 14, wherein:

the communicating comprises communicating, with the registration response message, an explicit indication for each particular S-NSSAI of the conditional NSSAI, an explicit indication of which TAs of the RA support the particular S-NSSAI and an explicit indication of the respective re-registration condition associated with the particular S-NSSAI.

* * * * *